(12) United States Patent
Kwak (10) Patent No.: US 7,133,651 B2
(45) Date of Patent: Nov. 7, 2006

(54) TRANSMISSION APPARATUS FOR MOBILE COMMUNICATION TERMINAL

(75) Inventor: Soon-Hyeok Kwak, Seoul (KR)

(73) Assignee: LG Electronics Inc., Seoul (KR)

( * ) Notice: Subject to any disclaimer, the term of this patent is extended or adjusted under 35 U.S.C. 154(b) by 445 days.

(21) Appl. No.: 10/691,613

(22) Filed: Oct. 24, 2003

(65) Prior Publication Data

US 2004/0092239 A1    May 13, 2004

(30) Foreign Application Priority Data

Nov. 4, 2002   (KR) .................. 10-2002-0067864
Dec. 27, 2002  (KR) .................. 10-2002-0085096

(51) Int. Cl.
*H01Q 11/12*  (2006.01)
*H04B 1/04*   (2006.01)

(52) U.S. Cl. .............. 455/127.2; 375/297; 330/289

(58) Field of Classification Search ............ 455/115.1, 455/127.1, 127.2, 127.3, 522, 550.1; 330/250, 330/278, 289; 375/222, 296, 297
See application file for complete search history.

(56) References Cited

U.S. PATENT DOCUMENTS

| | | | |
|---|---|---|---|
| 5,099,204 A | * | 3/1992 | Wheatley, III .............. 330/279 |
| 6,418,301 B1 | * | 7/2002 | Le et al. ..................... 455/73 |
| 6,661,999 B1 | * | 12/2003 | Johnson et al. .......... 455/127.1 |
| 6,771,930 B1 | * | 8/2004 | Buer ........................ 455/522 |
| 6,795,694 B1 | * | 9/2004 | Uesugi ...................... 455/126 |

FOREIGN PATENT DOCUMENTS

KR        010027307 A       4/2001

OTHER PUBLICATIONS

A copy of Korean Office Action dated Aug. 30, 2004.

* cited by examiner

*Primary Examiner*—Quochien B. Vuong
(74) *Attorney, Agent, or Firm*—Fleshner & Kim LLP (57) ABSTRACT

A transmission apparatus of a mobile communication terminal is implemented so that a modem, a gain controller and a power controlling circuit have one loop construction. In the transmission apparatus, an AGC signal of a modem is precisely adjusted according to an internal temperature of the terminal, and the adjusted AGC signal is applied to gain control in real time, so that a consumption amount of battery due to a loss of a current can be remarkably reduced.

21 Claims, 6 Drawing Sheets

TRANSMISSION APPARATUS FOR MOBILE COMMUNICATION TERMINAL

BACKGROUND OF THE INVENTION

1. Field of the Invention

The present invention relates to a mobile communication terminal, and particularly to an apparatus for controlling power of a mobile communication terminal.

2. Description of the Background Art

In a terminal of a mobile communication system, an internal temperature of the terminal has large influence on its performance and used hours of a battery. Because of this, the terminal includes a temperature detecting device and an amplifying device therein, and thus can check the internal temperature of the terminal, and adjust transmission power according to the temperature, through these devices.

Figure 1:
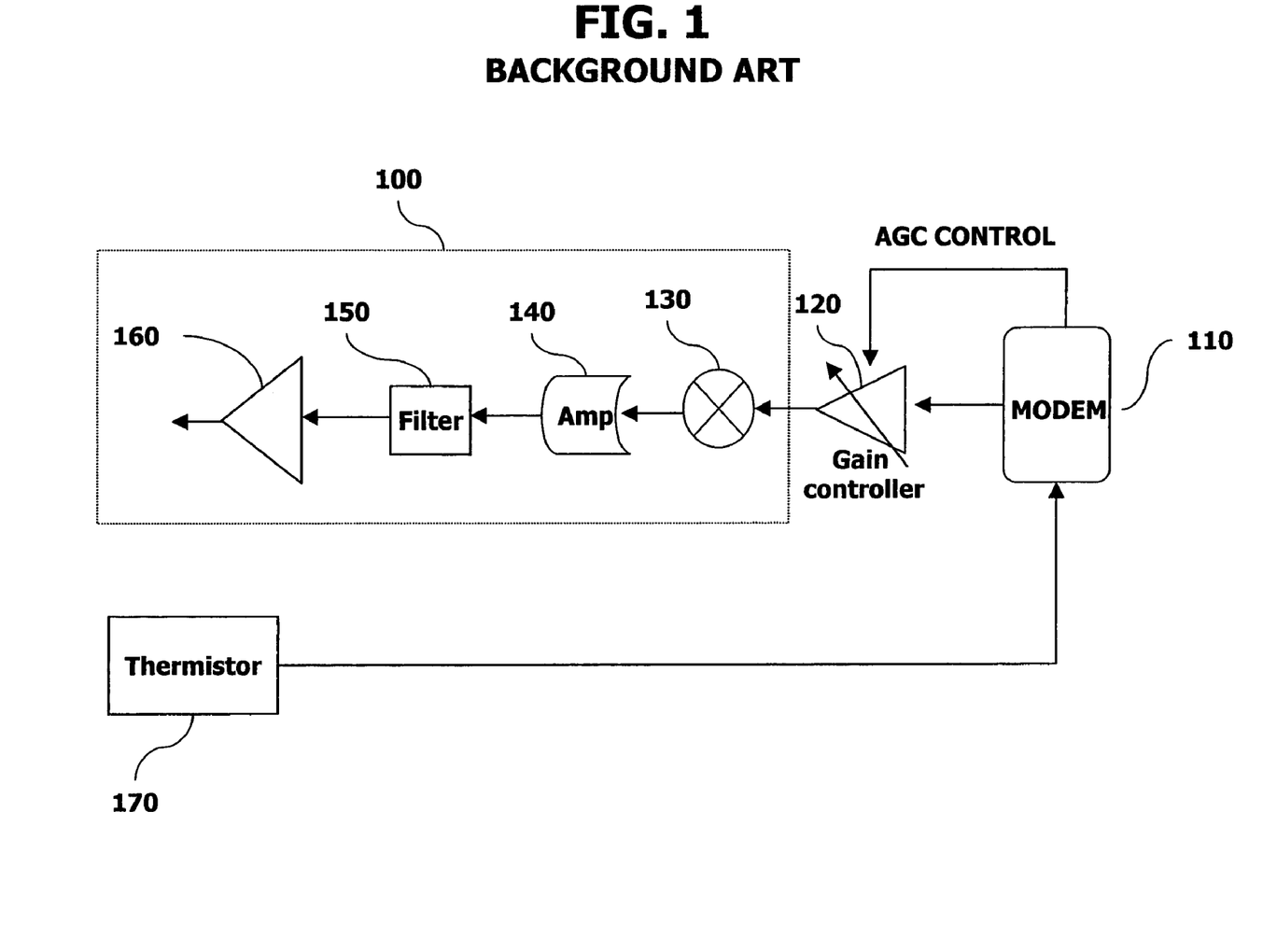
FIG. 1 is a block diagram showing a transmission apparatus of the general mobile communication terminal.

FIG. 1 is a block diagram of a transmission apparatus of a general mobile communication terminal.

As shown therein, the general mobile communication terminal includes a modem 110 for outputting an intermediate frequency (IF) signal and an auto gain control (AGC) signal; a gain controller 120 for adjusting a gain of the IF signal outputted from the modem 110, according to the AGC signal; a frequency mixer 130 converting the adjusted IF signal into a radio frequency (RF) signal; a drive amplifier 140 for amplifying the RF signal; a filter 150 for bandwidth filtering the amplified RF signal; a power amplifier 160 for sufficiently amplifying power of an output signal of the filter 150 as much as the output signal can be transmitted to a receiving side through the air; and a thermistor 170 for detecting an internal temperature of the terminal and applying the detecting result to the modem 110.

For convenience sake of explanation, hereinafter, the frequency mixer 130, the drive amplifier 150, and a power amplifier 160 will be referred to a transmission signal processing block.

In the background art constructed as above, the thermistor 170 receives a predetermined voltage corresponding to the internal temperature of the terminal, converting the received voltage into a DC voltage, and applying the DC voltage to the modem 110. Then, the modem 110 estimates an internal temperature of the terminal based on a level of the applied DC voltage, and compares the estimated temperature with a reference temperature. Through this comparison, the modem 110 generates a predetermined AGC signal so that the terminal can maintain a proper temperature thereof, and applies the AGC signal to the gain controller 120.

The gain controller 120 adjusts power of the IF signal outputted from the modem 110, according to the applied AGC signal.

Through the process above, the mobile communication terminal controls the gain of the transmission power so as to prevent its internal temperature from increasing more than the reference temperature. In the background art above, considering that characteristics of internal devices of the terminal is changed according to a temperature, the thermistor 170 is mounted in the vicinity of internal devices of the terminal. In addition, using the thermistor 170, the internal temperature of the terminal is compensated.

However, since the thermistor is implemented as an independent circuit and the internal temperature of the terminal is affected by various environmental factors, the temperature detected by the thermistor does not always correspond to actual power of the transmission apparatus.

That is, since a resistance characteristic value of the thermistor is changed according to change of the internal temperature of the terminal and thereby changing the DC voltage level, a compensation value which actually controls power, may not be correct. If power is outputted more than a reference level by incorrect compensation, a battery is rapidly consumed.

SUMMARY OF THE INVENTION

Therefore, an object of the present invention is to provide a transmission apparatus of a mobile communication terminal implemented so that a modem, a gain controller and a power controlling circuit have one loop construction.

To achieve these and other advantages and in accordance with the purpose of the present invention, as embodied and broadly described herein, there is provided a transmission apparatus for a mobile communication terminal including a modem for outputting an intermediate frequency (IF) signal and an AGC signal; a gain controller for adjusting a gain of the IF signal according to the AGC signal; a power controlling circuit for adjusting the AGC signal according to temperature change of the terminal, and applying the adjusted AGC signal to the gain controller; and a transmission signal processing block converting the IF signal whose gain is adjusted, into a radio frequency (RF) signal, amplifying and bandwidth filtering the converted RF signal, then amplifying power of the RF signal as much as the RF signal can reach a receiving side, and emitting the amplified RF signal.

Preferably, the transmission signal processing block includes a mixer for converting the signal whose gain is adjusted, into a RF signal; a drive amplifier for amplifying the RF signal; a filter for bandwidth filtering the amplified signal; and a power amplifier for sufficiently amplifying power of the signal as much as the filtered signal can be transmitted to a receiving side through the air.

Preferably, the power controlling circuit is positioned between the modem and the gain controller.

Preferably, the power controlling circuit includes a thermistor whose one side is connected with the modem, and whose other side is connected with the gain controller; and a resistor whose one side is earthed, and whose other side is connected with the thermistor in parallel.

Preferably, the power controlling circuit includes a first resistor whose one side is connected with the modem; a second resistor whose one side is connected with the first resistor, and whose other side is connected with the gain controller; and a thermistor whose one side is earthed, and whose other side is connected with the first and second resistors in parallel.

Preferably, the power controlling circuit includes an AGC adjuster for adjusting an AGC signal of the modem according to temperature change of the terminal, and applying the adjusted AGC signal to the gain controller; and a signal amplifier for amplifying the AGC signal applied to the gain controller at a voltage level as much as the modem can recognize, and transmitting the amplified AGC signal to the modem.

Preferably, the AGC adjuster includes a thermistor whose one side is connected with the modem, and whose other side is connected with the gain controller; and a resistor whose one side is earthed, and whose other side is connected with the thermistor in parallel.

Preferably, the AGC adjuster includes a first resistor whose one side is connected with the modem; a second resistor whose one side is connected with the first resistor, and whose other side is connected with the gain controller;

and a thermistor whose one side is earthed, and whose other side is connected with the first and second resistors in parallel.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

In the present invention, a power controlling circuit is mounted between the modem and the gain controller so that the power controlling circuit can control transmission power of the transmission apparatus by directly adjusting an AGC signal of the modem according to temperature change of the transmission apparatus of the terminal.

Reference will now be made in detail to the preferred embodiments of the present invention, examples of which are illustrated in the accompanying drawings.

Figure 2:
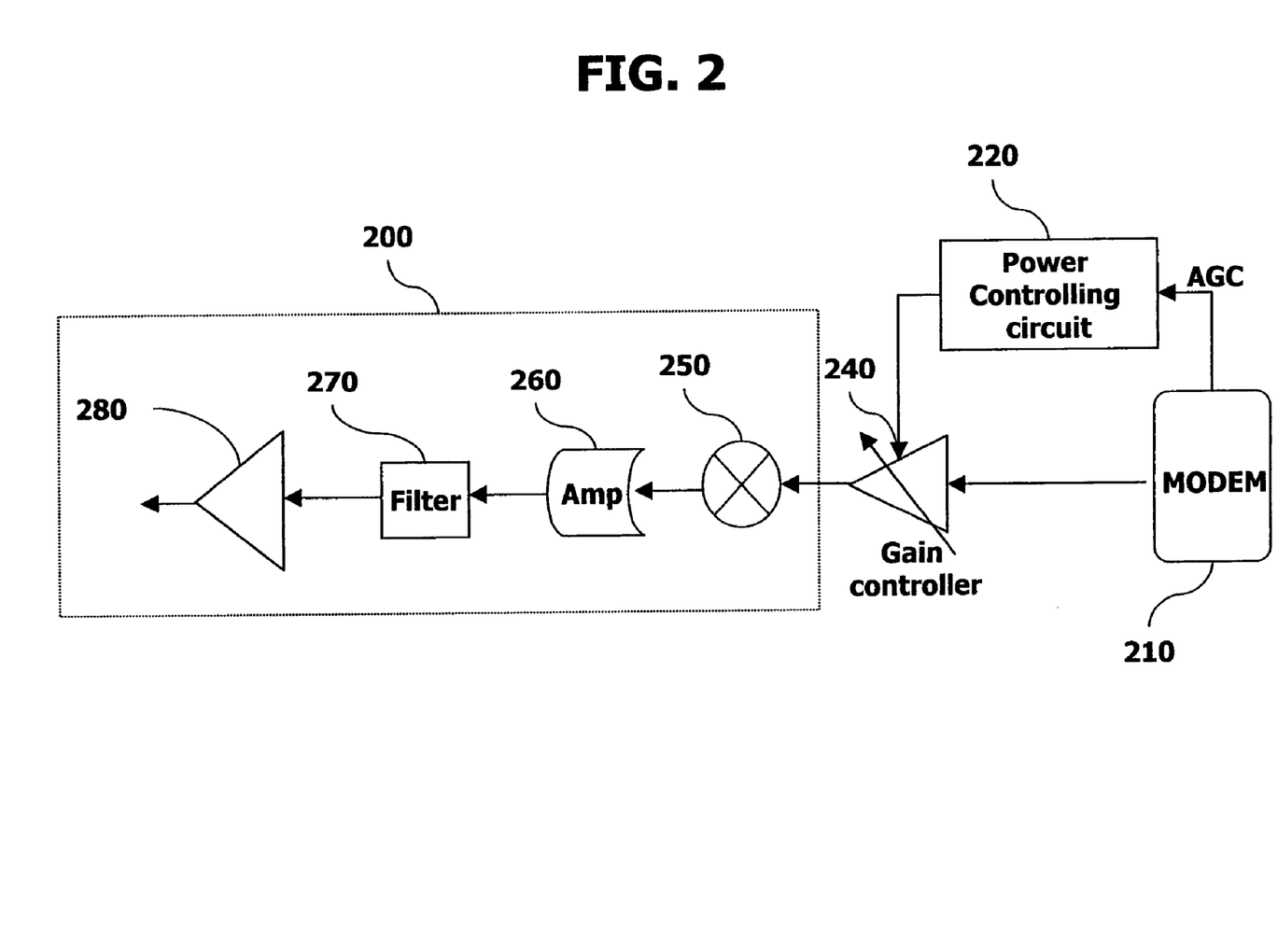
FIG. 2 is a block diagram showing a transmission apparatus of a mobile communication terminal according to one embodiment of the present invention.

FIG. 2 is a block diagram showing a transmission apparatus of a mobile communication terminal.

As shown therein, a transmission apparatus of a mobile communication terminal according to one embodiment, includes: a modem 210 for outputting an intermediate frequency (IF) signal and an AGC signal; a gain controller 240 for adjusting a gain of the IF signal according to the AGC signal; a power controlling circuit 220 for adjusting the AGC signal according to temperature change of the terminal and applying the adjusted AGC signal; and a transmission signal processing block 200 for converting the IF signal, whose gain is adjusted, into a radio frequency (RF) signal, amplifying and bandwidth filtering the converted RF signal, then amplifying power of the RF signal as much as being able to reach a receiving side, and emitting the amplified RF signal.

The transmission signal processing block 200 includes a frequency mixer 250 for converting the signal whose gain is adjusted, into a RF signal; a drive amplifier 260 for amplifying the RF signal; a filter 270 for bandwidth filtering the amplified signal; and a power amplifier 280 for amplifying power as much as the output signal of the filter 270 can reach a receiving side through the air. Constructions and functions of the transmission signal processing block 200 are the same as those of the conventional block.

The power controlling circuit 220 adjusts an AGC signal applied to the gain controller 240 from the modem 210. That is, the power controlling circuit 220 adjusts the AGC signal immediately according change of an internal temperature of the terminal, using a device such as a thermistor varying a characteristic value of resistance according to an input voltage. The gain controller 240 compensates a gain of the IF signal outputted from the modem, according to the adjusted AGC signal.

The IF signal whose gain has been compensated by the gain controller 240, is transmitted to the transmission signal processing block 200 and then processed in the same manner as in the background art.

Figure 3A:
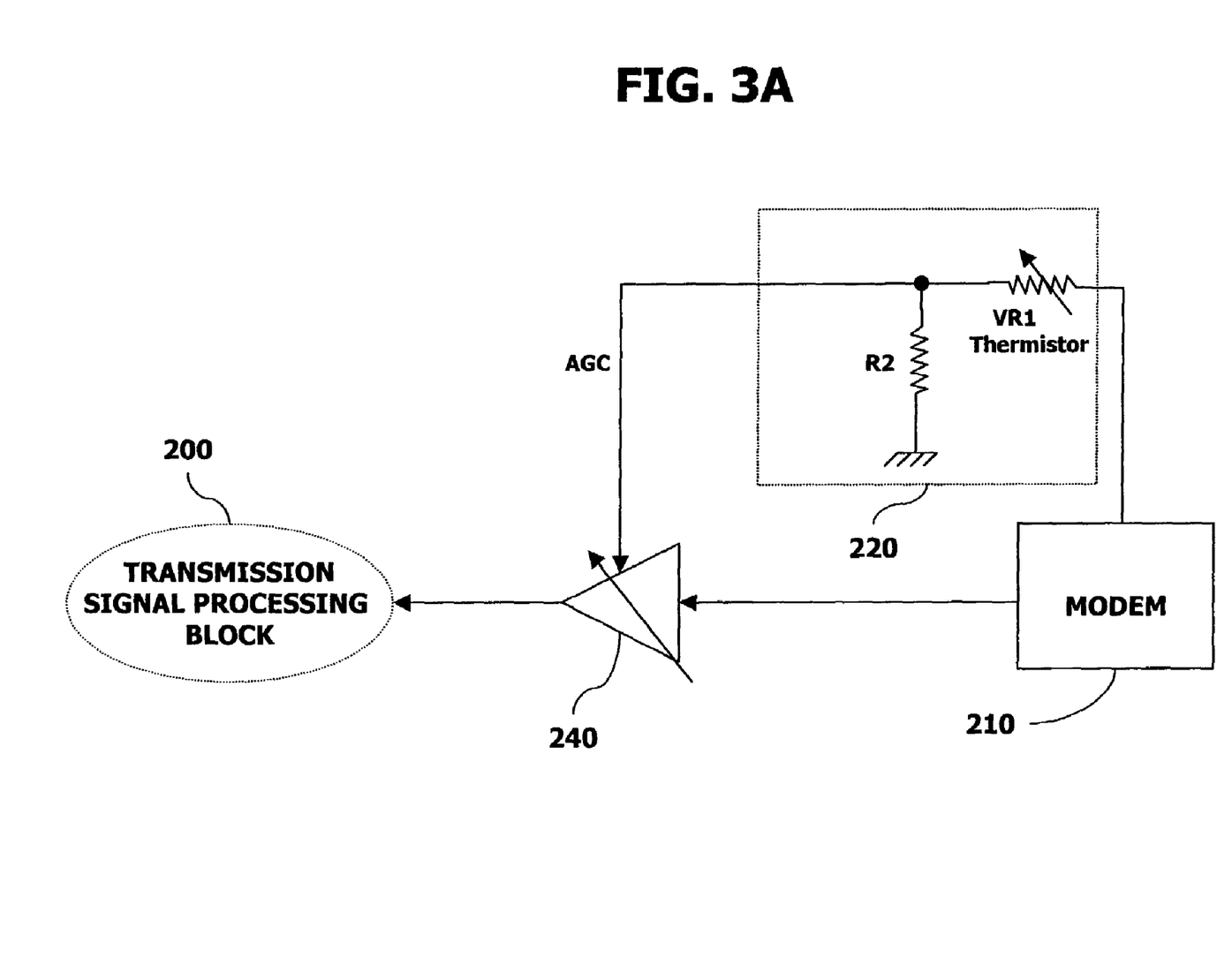
FIGS. 3a and 3b are drawings showing a construction of a power controlling circuit of FIG. 2.
Figure 3B:
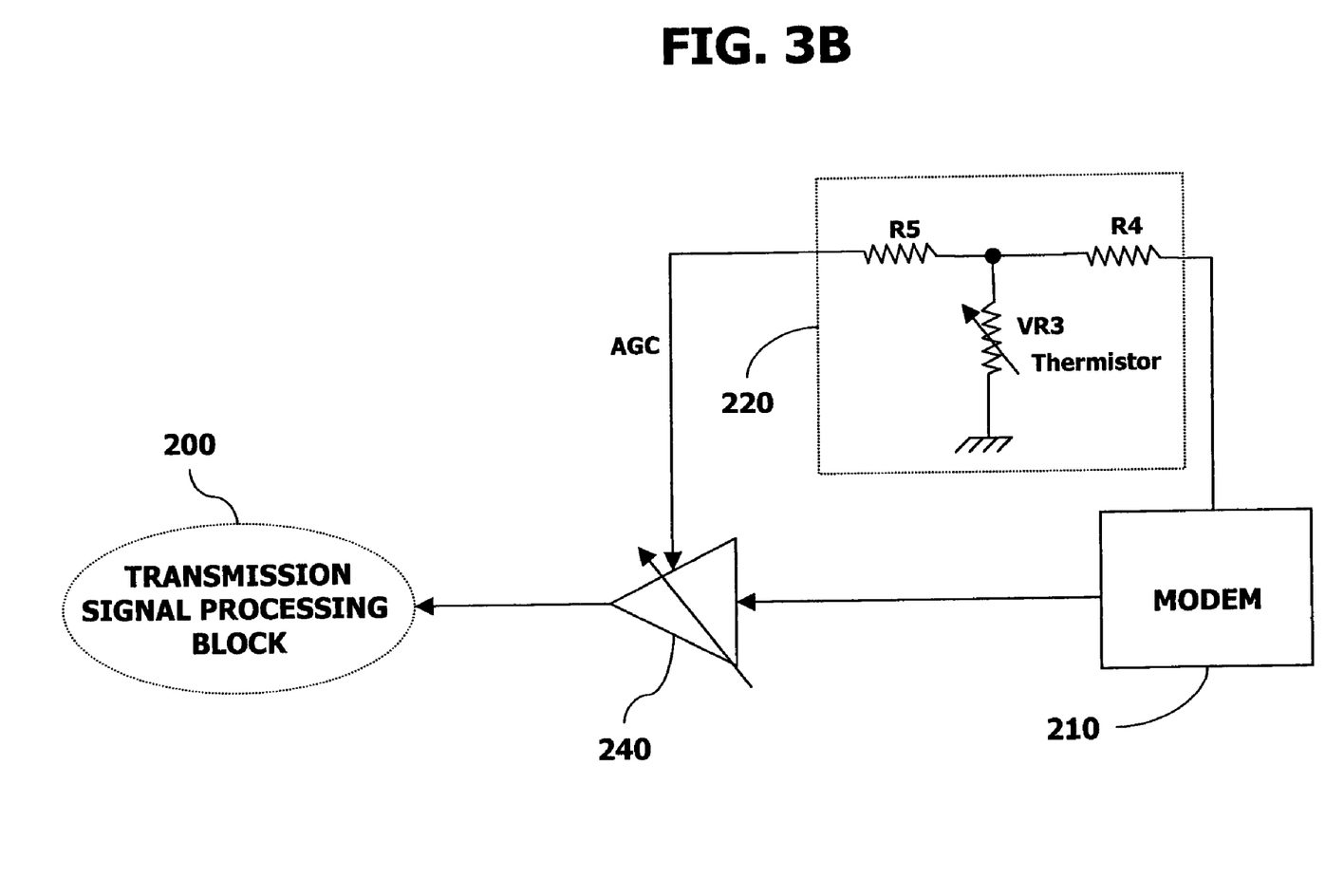

FIGS. 3a and 3b are drawings showing a construction of a power controlling circuit according to one embodiment of the present invention.

As shown in FIG. 3a, a power controlling circuit 220 according to one embodiment includes a thermistor ($VR_1$) whose one side is connected with the modem 210, whose other side is connected with the gain controller 240; and a resistor (R2) whose one side is earthed, and whose other side is connected with the thermistor ($VR_1$) in parallel.

As shown in FIG. 3b, the power controlling circuit 220 may include a resistor (R4) whose one side is connected with the modem 210; a resistor (R5) whose one side is connected with the resistor (R4), and whose other side is connected with the gain controller 240; and a thermistor ($VR_3$) whose one side is earthed, and whose other side is connected with the resistors (R4 and R5) in parallel.

A thermistor ($VR_1$ or $VR_3$) used in the power controlling circuit 220 is a kind of variable resistor, and has a characteristic value of 63 k$\Omega$. Since, the characteristic value (63 k$\Omega$) of the resistance, changes along with change of an internal temperature of the terminal, a voltage of an AGC signal having passed through the power controlling circuit 220 is greater (or smaller) than a primary voltage value. According to the AGC signal having passed through the power controlling circuit 220, the gain controller 240 adjusts a power gain of the IF signal outputted from the modem 210. Consequently, the transmission apparatus of the terminal can precisely control transmission power according to change of an internal temperature of the terminal.

Figure 4:
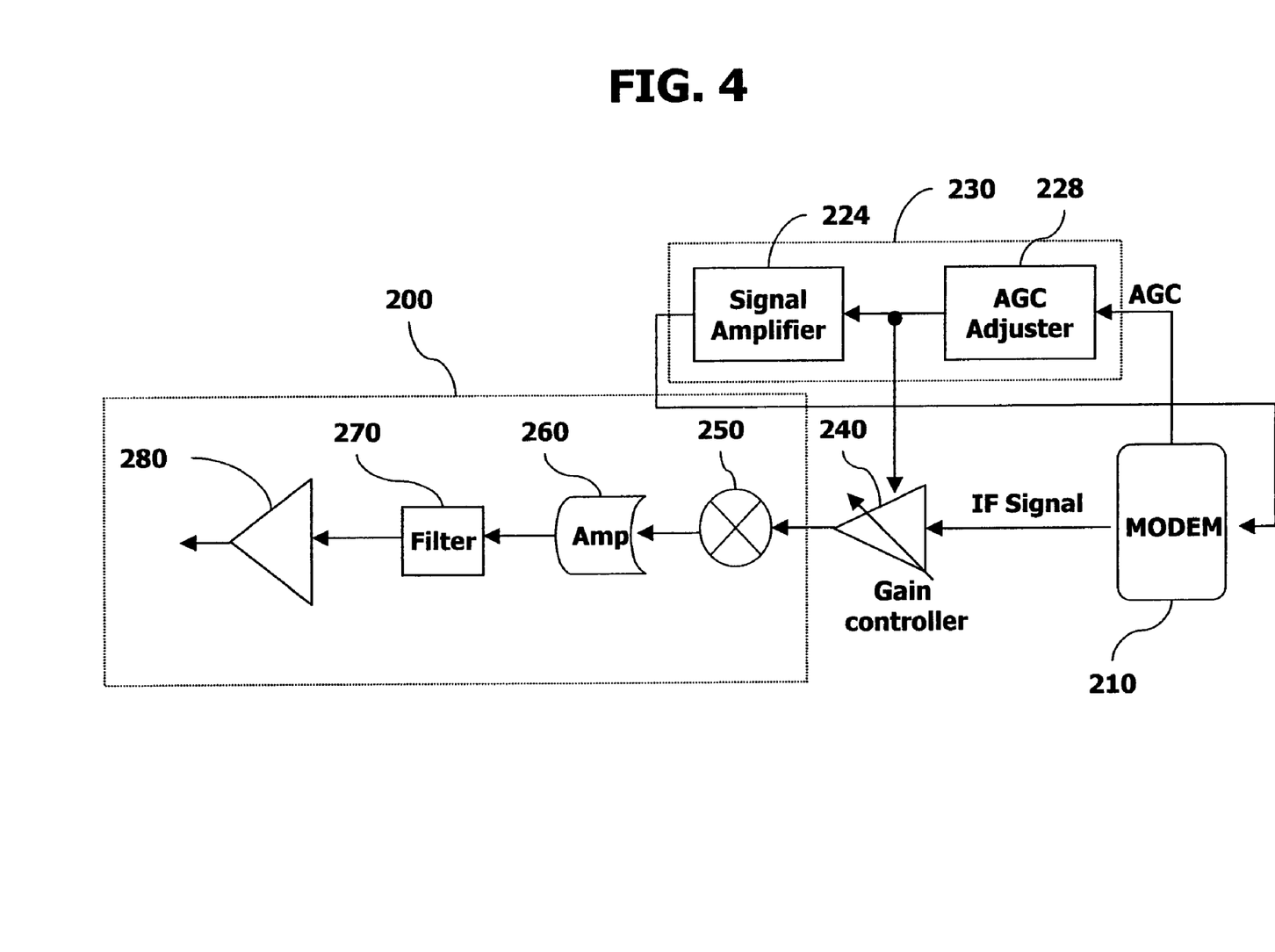
FIG. 4 is a block diagram showing a transmission apparatus of a mobile communication terminal according to another embodiment of the present invention.

FIG. 4 is a block diagram showing a transmission apparatus of a mobile communication terminal according to another embodiment of the present invention.

As shown therein, a transmission apparatus of a mobile communication terminal according to another embodiment of the present invention, is the same as that according to one embodiment of the present invention, except a power controlling circuit 230, The power controlling circuit 230 according to another embodiment of the present invention includes an AGC adjuster 288 for adjusting an AGC signal applied from the modem 210, and applying the adjusted AGC signal to the gain controller 240; and a signal amplifier 224 for amplifying the AGC signal applied to the gain controller 240 at a voltage level as much as the modem 210 can recognize, and then transmitting the amplified AGC signal to the modem 210.

The AGC adjuster 228 adjusts an AGC signal (hereinafter, will be referred to a first AGC signal) applied to the gain controller 240 from the modem 210. That is, the AGC adjuster 228 adjusts the first AGC signal immediately according to change of the internal temperature of the terminal, using a device such as a thermistor varying a resistance value according to an input voltage.

Figure 5:
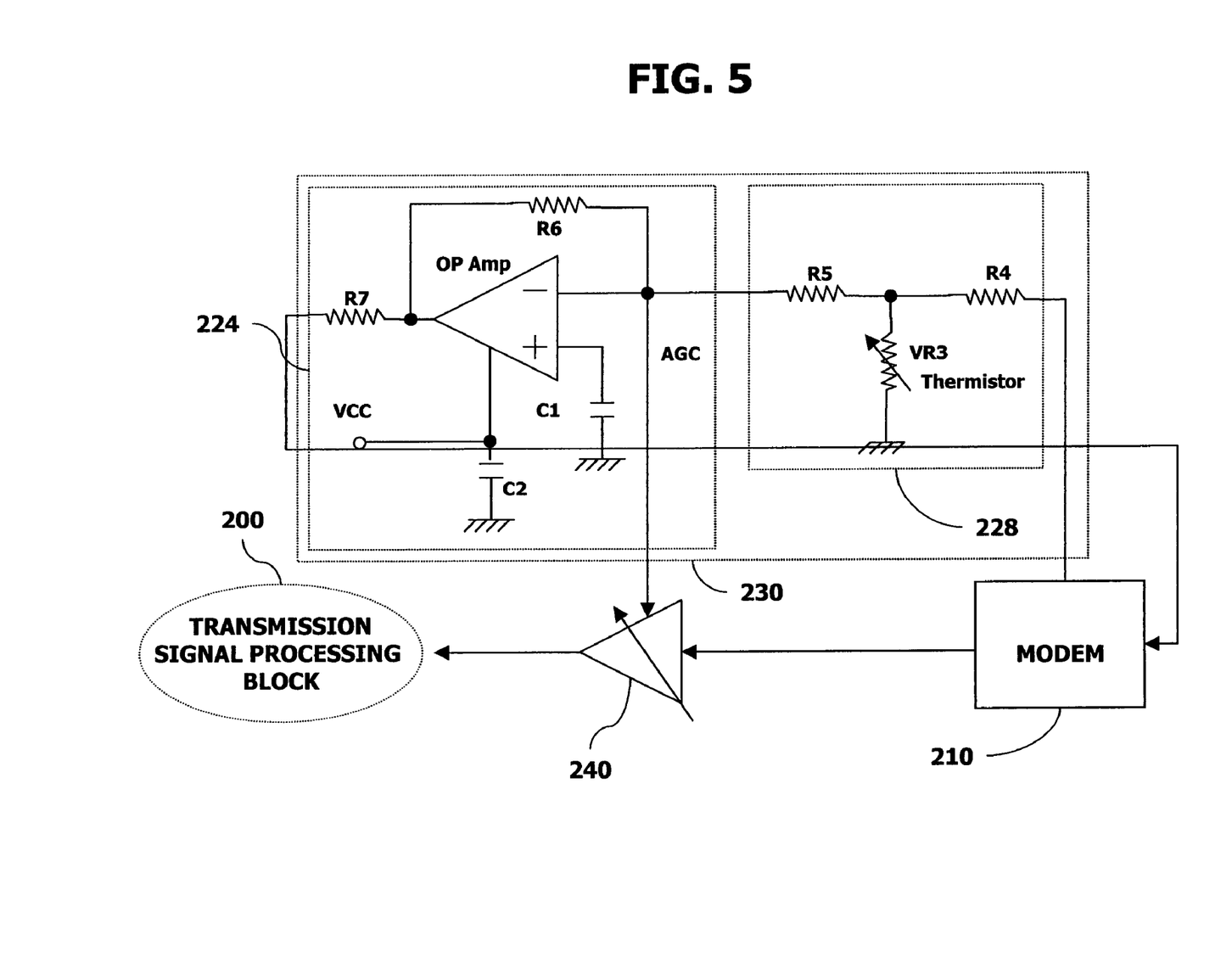
FIG. 5 is a drawing showing a construction of a signal amplifier of FIG. 4.

The signal amplifier 224 is a kind of amplifying circuit receiving an actual AGC signal (will be referred to a second AGC signal) applied to the gain controller 240 and amplifying the second AGC signal at a voltage level as much as the modem 210 can recognize, and is implemented, using an operational amplifier. (Refer to FIG. 5) The amplified second AGC signal is applied to the modem 210 so that the modem 210 can monitor the second AGC signal applied to the gain controller 240.

The modem 210 generates a certain AGC signal while monitoring the second AGC signal. That is, the modem 210 estimates an internal temperature of the terminal based on the second AGC signal, and compares the estimated temperature with a reference temperature. Through this comparison, the modem 210 generates a certain AGC signal (a first AGC signal) so that the terminal can maintain a proper temperature thereof, and applies the generated AGC signal to the power controlling circuit 230.

The AGC adjuster 228 has the same construction as the power controlling circuit 220 according to one embodiment. That is, as shown in FIG. 3a, the AGC adjuster 228 includes a thermistor (VR$_1$) and a resistor (R$_2$), Also, as shown in FIG. 3b, the AGC adjuster 228 may include a resistor (R4), a resistance (R$_5$) and a thermistor (VR$_3$).

In the present invention, an AGC signal of a modem is precisely adjusted, and the adjusted AGC signal is applied to gain control in real time, so that a consumption amount of battery due to a loss of a current can be remarkably reduced.

Also, in the present invention, a modem, a gain controller and a power controlling circuit has one loop construction so that efficiency of power control can be improved. Also, a modem monitors an actual AGC signal applied to the gain controller so that a gain of a transmission power is more precisely controlled.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A transmission apparatus of a mobile communication terminal comprises:
    a modem for outputting an intermediate frequency (IF) signal, and an auto gain control(AGC) signal;
    a gain controller for adjusting a gain of the IF signal;
    a power controlling circuit for adjusting the AGC signal according to temperature change of the terminal, and applying the adjusted AGC signal to the gain controller, the power controlling circuit including a first resistor coupled in parallel to a thermistor to form a voltage divider, the voltage divider dividing the AGC signal based on resistance values of the first resistor and the thermistor to generate the adjusted AGC signal; and
    a transmission signal processing block for converting the IF signal whose gain is adjusted, into a radio frequency (RF) signal, amplifying and bandwidth filtering the converted RF signal, then amplifying power of the RF signal as much as the RF signal can reach a receiving side, and emitting the amplified RF signal.

2. The apparatus of claim 1, wherein the transmission signal processing block comprises:
    a mixer for converting the signal whose gain is adjusted, into a RE signal;
    a drive amplifier for amplifying the RF signal;
    a filter for bandwidth filtering the amplified signal; and
    a power amplifier for sufficiently amplifying power of the signal as much as the filtered signal can be transmitted to a receiving side through the air.

3. The apparatus of claim 1, wherein the power controlling circuit is positioned between the modem and the gain controller.

4. The apparatus of claim 1, wherein the thermistor has one side connected with the modem and another side connected with the gain controller, and wherein the resistor has one side earthed and another side connected with the thermistor in parallel.

5. A transmission apparatus of a mobile communication terminal, comprising:
    a modem for outputting an intermediate frequency (IF) signal and an auto gain control(AGC) signal;
    a gain controller for adjusting a gain of the IF signal;
    a power controlling circuit for adjusting the AGC signal according to temperature change of the terminal and applying the adjusted AGC signal to the gain controller; and
    a transmission signal processing block for converting the IF signal whose gain is adjusted, into a radio frequency (RF) signal, amplifying and bandwidth filtering the converted RF signal, then amplifying power of the RF signal as much as the RF signal can reach a receiving side, and emitting the amplified RF signal, wherein the power controlling circuit comprises:
    a first resistor whose one side is connected with the modem;
    a second resistor whose one side is connected with the first resistor, and whose other side is connected with the gain controller; and
    a thermistor whose one side is earthed, and whose other side is connected with the first and second resistors in parallel.

6. The apparatus of claim 5, wherein the first resistor and the thermistor form a voltage divider for dividing the AGC signal based on resistance values of the first resistor and the thermistor, and wherein the second resistor modifies a signal output from the voltage divider to form the adjusted AGC signal.

7. A transmission apparatus of a mobile communication terminal, comprising:
    a modem for outputting an intermediate frequency (IF) signal and an auto gain control(AGC) signal;
    a gain controller for adjusting a gain of the IF signal;
    a power controlling circuit for adjusting the AGC signal according to temperature change of the terminal and applying the adjusted AGC signal to the gain controller; and
    a transmission signal processing block for converting the IF signal whose gain is adjusted, into a radio frequency (RF) signal, amplifying and bandwidth filtering the converted RE signal, then amplifying power of the RF signal as much as the RF signal can reach a receiving side, and emitting the amplified RE signal, wherein the power controlling circuit comprises:
    an AGC adjuster for adjusting the AGC signal of the modem according to temperature change of the terminal to generate a first adjusted AGC signal, and applying the first adjusted AGC signal to the gain controller; and a signal amplifier for amplifying the first adjusted AGC signal applied to the gain controller to form a second adjusted AGC signal, the second adjusted AGC signal amplified at a voltage level according to a predetermined level of performance of the modem and transmitted to the modem.

8. The apparatus of claim 7, wherein the AGC adjuster comprises:
a first resistor whose one side is connected with the modem;
a second resistor whose one side is connected with the first resistor, and whose other side is connected with the gain controller; and
a thermistor whose one side is earthed, and whose other side is connected with the first and second resistors in parallel.

9. The apparatus of claim 8, wherein the first resistor and the thermistor form a voltage divider for dividing the AGC signal based on resistance values of the first resistor and the thermistor, and wherein the second resistor modifies a signal output from the voltage divider to form the adjusted AGC signal.

10. The apparatus of claim 7, wherein the signal amplifier is implemented using an operational amplifier.

11. The apparatus of claim 7, wherein the AGC adjuster comprises:
a thermistor; and
a resistor coupled in parallel to the thermistor to form a voltage divider, wherein the voltage divider divides the AGC signal based on resistance values of the resistor and the thermistor to generate the adjusted AGC signal.

12. The apparatus of claim 11, wherein the thermistor has one side connected with the modem and another side connected with the gain controller, and wherein the resistor has one side earthed and another side connected with the thermistor in parallel.

13. The apparatus of claim 11, wherein the signal amplifier includes:
an operational amplifier having a first terminal coupled to receive the first adjusted AGC signal corresponding to the divided AGC signal generated by the voltage divider and a second terminal coupled to receive a reference voltage.

14. The apparatus of claim 7, wherein the signal amplifier includes:
an operational amplifier having a first terminal coupled to receive the first adjusted AGC signal and a second terminal coupled to receive a reference voltage.

15. The apparatus of claim 14, further comprising:
a control circuit coupled to control a gain of the operational amplifier to amplify the first adjusted AGC signal according to the predetermined level of performance of the modem.

16. The apparatus of claim 14, wherein the control circuit includes:
a capacitor coupled to a gain control input of the operational amplifier through a node coupled to a supply voltage, a capacitance of the capacitor set to correspond to the predetermined level of performance of the modem.

17. The apparatus of claim 7, wherein the AGC adjuster comprises:
a thermistor;
a first resistor coupled in parallel to the thermistor to form a voltage divider which divides the AGC signal based on resistance values of the resistor and the thermistor; and
a second resistor to modify a signal output from the voltage divider to form the first adjusted AGC signal.

18. The apparatus of claim 17, wherein the signal amplifier includes:
an operational amplifier having a first terminal coupled to receive the first adjusted AGC signal from the second resistor and a second terminal coupled to receive a reference voltage.

19. The apparatus of claim 7, wherein the modem monitors the first adjusted AGC signal and modifies the AGC signal input into the AGC adjuster based on changes in the second adjusted AGC signal.

20. The apparatus of claim 19, wherein the modem monitors the first adjusted AGC signal based on the second adjusted AGC signal fed back from the signal amplifier.

21. The apparatus of claim 7, wherein the modem:
estimates an internal temperature of the mobile communication terminal based on the second adjusted AGC signal;
compares the estimated temperature to a reference temperature; and
generates the AGC signal input into the AGC adjuster based on the comparison.

* * * * *